(12) United States Patent
Sodani

(10) Patent No.: US 7,272,701 B2
(45) Date of Patent: Sep. 18, 2007

(54) METHOD AND APPARATUS FOR LIMITING PORTS IN A REGISTER ALIAS TABLE HAVING HIGH-BANDWIDTH AND LOW-BANDWIDTH STRUCTURES

(75) Inventor: Avinash Sodani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 10/692,436

(22) Filed: Oct. 22, 2003

(65) Prior Publication Data
US 2005/0091475 A1    Apr. 28, 2005

(51) Int. Cl.
G06F 9/345    (2006.01)
(52) U.S. Cl. .................................... 712/217
(58) Field of Classification Search .............. 712/27, 712/217
See application file for complete search history.

(56) References Cited

U.S. PATENT DOCUMENTS 5,481,683 A * 1/1996 Karim ..................... 712/217
5,758,112 A * 5/1998 Yeager et al. .............. 712/217
6,112,019 A * 8/2000 Chamdani et al. .......... 712/214

* cited by examiner

Primary Examiner—Eddie Chan
Assistant Examiner—David J. Huisman
(74) Attorney, Agent, or Firm—Blakely, Sokoloff, Taylor & Zafman LLP

(57) ABSTRACT

A method and apparatus for a microprocessor with a divided register alias table is disclosed. In one embodiment, a first register alias table may have a full set of read and write ports, and a second register alias table may have a smaller set of read and write ports. The second register alias table may include translations for those logical register addresses that are used less frequently. When the second register alias table is called upon to translate more logical register addresses than it has read ports, in one embodiment a pipeline stall may permit additional time to utilize the limited read ports. In another embodiment, additional build rules for a trace cache may be utilized.

20 Claims, 5 Drawing Sheets

METHOD AND APPARATUS FOR LIMITING PORTS IN A REGISTER ALIAS TABLE HAVING HIGH-BANDWIDTH AND LOW-BANDWIDTH STRUCTURES

FIELD

The present disclosure relates generally to microprocessors, and more specifically to microprocessors utilizing a pipeline architecture.

BACKGROUND

Modern microprocessors often use pipeline architectures. In a pipeline architecture, operations to be executed progress through various stages in a given order. Such stages may include prefetching, fetching, decoding, allocating, register renaming, queuing, scheduling, dispatching, reading registers, execution, and retirement. Placing such functional stages in a predetermined order may improve execution performance. One drawback of a pipelined architecture is the need to flush the pipeline and refill it upon reaching a branch that has been incorrectly predicted. However, improvements in prediction logic have made this drawback less burdensome than in the past. The use of pipelines has carried forward in the design of processors with parallel structure. In these, the pipeline may be widened to accommodate multiple simultaneous operations which can be executed by multiple execution units.

Certain of the stages in a pipeline involve reading to or writing from specialized memories. For example, in the register renaming stage, wherein logical register addresses are mapped to actual physical register addresses, a special memory called a register alias table (RAT) may be used. In the RAT, the logical address in a particular context may serve as the address of the RAT and the resulting physical register address may serve as the resulting data from the RAT. In this way a processor having an instruction set with a limited number of logical registers may support many more physical registers available for use. Other stages of a pipeline may also involve the use of other forms of specialized memories.

The use of these specialized memories, which must be read from or written to from various stages, generally means that they must have multiple read and write ports. For example, if a RAT supports instructions that require up to two operands, a worst-case design requires two simultaneous read ports for the RAT. In the case of a pipelined processor that can process N instructions in parallel, the worst-case design would require 2N simultaneous read ports for the RAT. Experience with the design of such specialized memories shows that the area required on the semiconductor die, as well as the power consumed, increases in proportion to square of the number of read plus write ports.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for a processor using pipelined architecture to reduce the number of simultaneous read and write ports in specialized memories, such as register alias tables. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor using pipelined architecture where the specialized memories are register alias tables. However, the invention may be practiced in other configurations of specialized memories used within processors, such as register files.

Figure 1:
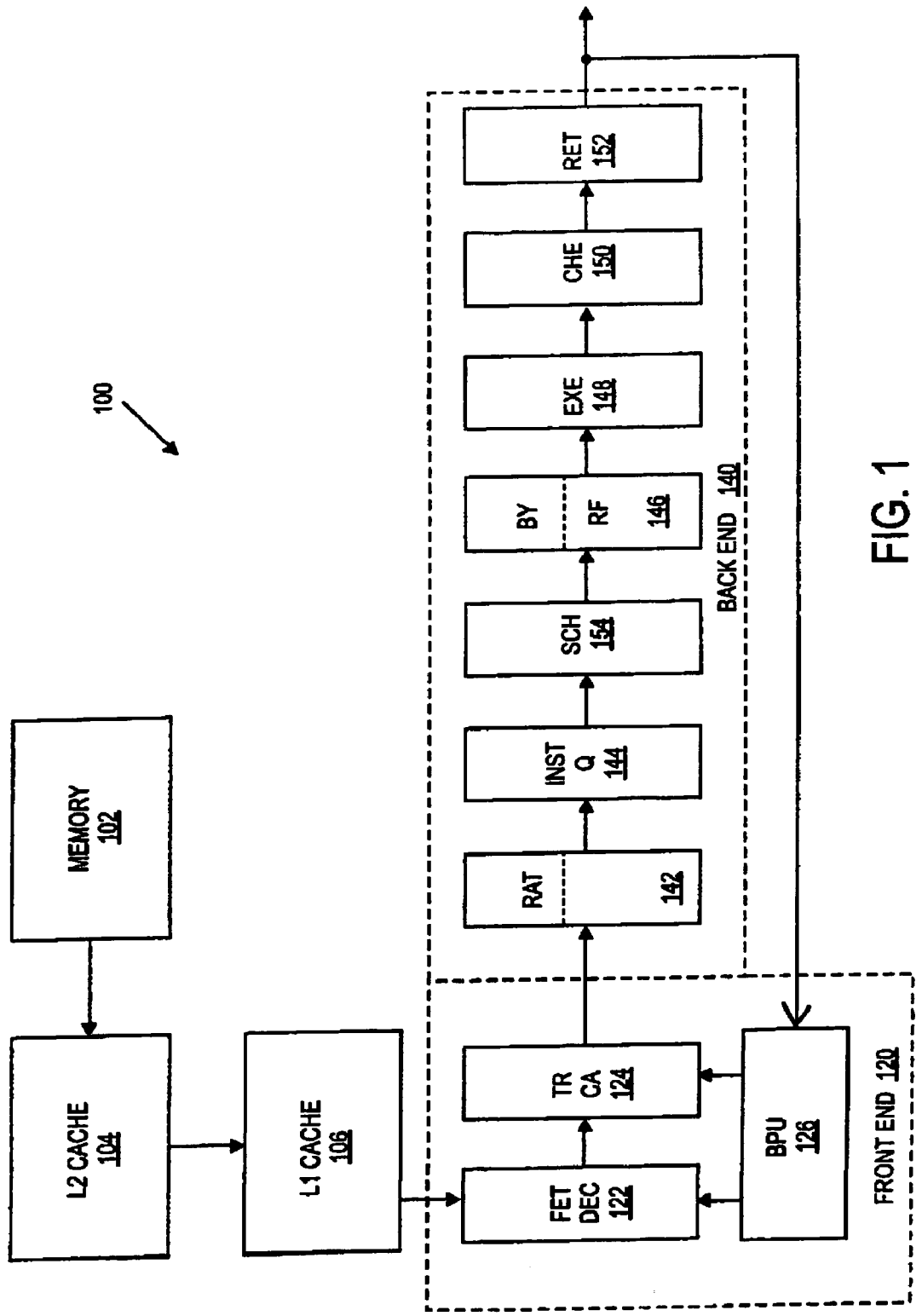
FIG. 1 is a schematic diagram of portions of a pipeline of a processor, according to one embodiment.

Referring now to FIG. 1, a schematic diagram 100 of portions of a pipeline of a processor is shown, according to one embodiment. The FIG. 1 pipeline may include a front end 120 and a back end 140. The front end 120 may include a fetch/decode stage 122. The fetch/decode stage 122 may fetch (and potentially prefetch) instructions from a memory hierarchy that may in one embodiment include an L1 cache 106, an L2 cache 104, and memory 102. In other embodiments, other forms of memory hierarchy may be used. The fetch/decode stage 122 may also decode the instructions. In one embodiment, macro-instructions may be decoded into sets of micro-operations.

The front end 120 may also include some kind of buffer to store instructions. In some embodiments, this may take the form of an L0 instruction cache or an instruction buffer. In the FIG. 1 embodiment, a trace cache 124 is used. In one embodiment, trace cache 124 may store linked sets of micro-operations called traces. Each macro-instruction may be stored in trace cache 124 in decoded form as one or more corresponding traces. Front end 120 may also contain a set of branch prediction units 126 for predicting which direction certain branches may take. In some embodiments the branch prediction units 126 may receive true execution history information from the retirement stage 152 of the back end 140.

The back end 140 may receive macro-instructions or micro-operations from the front end 120 and act upon them. In one embodiment, a register alias table (RAT) 142 may used. A RAT 142 is a particular kind of memory that may be used to translate logical register addresses, such as are used in software instructions, to physical register addresses, such as are used in hardware register files. The translation of logical register addresses to physical register addresses permits the use of many times more actual registers than would appear supported by a particular instruction set architecture. In some embodiments, the RAT 142 may include several component RATs with differing numbers of read ports and write ports depending upon the frequency of use of the logical register addresses.

The back end 140 may also include an instruction queue 144 and scheduler 154 to issue instructions, including micro-operations, in order to suit pipeline execution. A register file read/bypass stage 146 may be included to permit reading operand values from the physical register addresses supplied by the RAT 142. The register file read/bypass stage 146 may also support operands from a bypass circuit within back end 140. The values of some operands may be recently calculated within back end 140, and these may be supplied directly for use by subsequent operations. Since supplying these operands directly bypasses the register file, the circuits involved are referred to as bypass circuits.

Once the operands for the instructions, including micro-operations, are determined, the execution stage 148 may execute the instructions. Execution stage 148 may include several execution units for the execution of several instructions, including micro-operations, in parallel. After execution, the instructions, including micro-operations, are checked for proper branch prediction, exceptions, and other execution anomalies in a check stage 150. Instructions whose execution passes the checks of the check stage 150 may then be retired in the retirement stage 152, which may update the processor state as appropriate.

Figure 2:
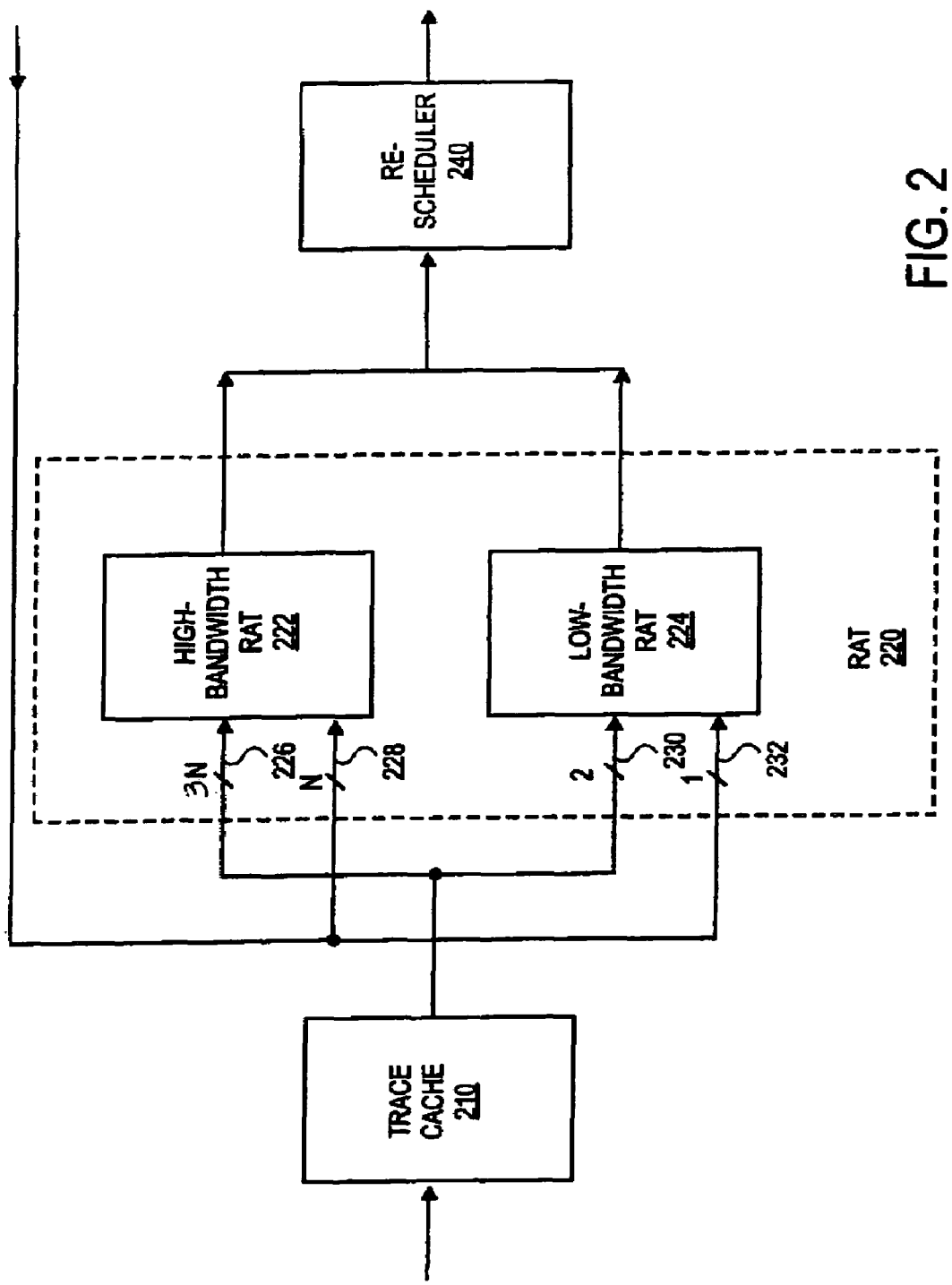
FIG. 2 is a schematic diagram of portions of a pipeline of a processor including two register alias tables, according to one embodiment.

Referring now to FIG. 2, a schematic diagram of portions of a pipeline of a processor including two register alias tables is shown, according to one embodiment. In the FIG. 2 embodiment a trace cache 210 is shown, but in other embodiments other forms of instruction buffers may be used to store pending instructions, including micro-operations. Micro-operations supplied by the trace cache 210 send their logical register addresses to the RAT 220 for translation to physical register addresses. As shown in FIG. 2, re-scheduler 240 is coupled to RAT 220. In processors conforming to the Intel® Corporation Pentium® architecture, each micro-operation may require up to 2 source operands along with 1 destination operand. A read port may be required for each source operand, and an additional read port may be required to read out the old mapping for the destination register. (The old mapping may be read before it is overwritten in order to free it when the micro-operation is retired.) Consider a back end capable of executing N instructions in parallel. Then a worst-case scenario would require that the RAT 220 have 3 read ports per instruction or a total of 3N read ports. Similarly, a destination operand may also require a write port to the RAT 220, so then a worst-case scenario would require that the RAT 220 have 1 write port per instruction or a total of N write ports. Using a conventional RAT, this would mean that a total of 3N read ports and N write ports for each and every logical register address. It is noteworthy that the physical size of a multi-ported structure, such as a RAT, typically grows in size in proportion to the square of the number of ports. For example, a structure with 4N ports (3N+N ports) may be 16 times larger than an equivalent structure that only has N ports. Thus, as the number of ports increase, the structures may become increasingly expensive in terms of physical size, power consumption, and time to design.

Rather than produce RAT 220 with 3N read ports and N write ports for all possible logical register addresses, in one embodiment RAT 220 includes a high-bandwidth RAT 222 and a low-bandwidth RAT 224. This implementation may be based on an experimental observation that not all logical register addresses may be accessed equally frequently. Some logical register addresses may be accessed frequently, while others may be accessed relatively infrequently. Instead of storing all logical register addresses in a single RAT structure, it is possible to allocate them between the high-bandwidth RAT 222 and low-bandwidth RAT 224 by storing the frequently-accessed logical register names in the high-bandwidth RAT 222 and the infrequently-accessed ones in the low-bandwidth RAT 224. Because the low-bandwidth RAT 224 may be accessed relatively infrequently, it may be implemented using fewer ports than the 3N reads and N write ports described above. Therefore, instead of implementing a single, large RAT with 3N read and N write ports (which may be very expensive in terms of size and power consumption), an embodiment may have two smaller RAT structures, one of which (low-bandwidth RAT 224) may have a reduced number of ports. The small sizes and small number of ports may make these RATs more efficient in terms of size and power consumption. In the present disclosure, "high-bandwidth" and "low-bandwidth" do not necessarily refer to the operational frequency of the semiconductor circuits but rather to the statistical frequency of access of the logical register addresses contained within.

In one embodiment, those logical register addresses that are determined to be frequently accessed may be accessed in a high-bandwidth RAT 222. The high-bandwidth RAT 222 may include the full set of required read and write ports for the architecture under consideration. In the FIG. 2 embodiment, high-bandwidth RAT 222 may have 3N read ports 226 and N write ports 228. In other embodiments, the number of read ports and write ports to constitute a "full set" may be different. High-bandwidth RAT 222 may operate as would a conventional RAT, translating proffered logical register addresses into physical register addresses for subsequent use in the pipeline back end.

Low bandwidth RAT 224 may include a reduced set of read and write ports for those logical register addresses supported therein. In one embodiment, those logical register addresses that are determined to be less-frequently accessed may be accessed in low-bandwidth RAT 224. In the FIG. 2 embodiment, low-bandwidth RAT 224 may have 2 read ports 230 and 1 write port 232. In other embodiments, the number of read ports and write ports to constitute a "reduced set" of read and write ports may be different, as long as the numbers of read ports and write ports are fewer than those used in the corresponding high-bandwidth RAT. Low-bandwidth RAT 224 may operate as would a conventional RAT, translating proffered logical register addresses into physical register addresses for subsequent use in the pipeline back end as long as the number of proffered logical register addresses does not exceed the number of read ports or write ports.

Determining which particular logical register addresses should be serviced by a high-bandwidth RAT 222 or by a low-bandwidth RAT 224 may include several general processes. One underlying theme of these processes may be to assign logical register addresses that are frequently accessed to high-bandwidth RAT 222 and those that are infrequently accessed to low-bandwidth RAT 224. In one technique, the statistical frequency of logical-register addresses use can be experimentally determined and the data used to allocate the logical register addresses between the high-bandwidth and low-bandwidth RATs. In another technique, the typical usage of a logical register address may be used to determine to which RAT it may be assigned. For example, when macro-instructions are represented by a corresponding sequence or "flow" of micro-operations, several temporary registers may be used. In some flows, only a few micro-operations may be used. In other flows, there may be dozens of micro-operations. The temporary registers may be infrequently used outside of the long micro-operation flows. In the latter case, there may be many temporary registers that are only used in such flows, and as such flows generally correspond to infrequently used instructions, such temporary registers may be determined to be candidates for being serviced by a low-bandwidth RAT 224.

In another technique, an architecture may include several "control" registers that are used infrequently. The "control" registers may contain information that determines certain modes of operation of the machine. Some examples of such modes may include how the rounding operations are performed after floating point operations, how the floating point exceptions are handled, and how the floating point denormal operations are handled. The information for the mode may be kept in a set of control registers that are infrequently changed. Such control registers may be determined to be candidates for being serviced by a low-bandwidth RAT 224. In yet another technique, a given compiler or set of compilers may tend to use some registers much more often than others. If so, then these compiler artifacts may be examined to determine which registers may be candidates for being serviced by a low-bandwidth RAT 224. In some embodiments, the selected registers may be used as a requirement on compiler designers.

The allocation of logical register addresses into two sets, for high-bandwidth RAT 222 use or low-bandwidth RAT 224 use, has been described as a non-dynamic process. However, as the contents of the RAT may be dynamically changed, it is possible in some embodiments to dynamically change the allocation of logical register addresses between the high-bandwidth RAT 222 and the low-bandwidth RAT 224. This would require that the contents of the high-bandwidth RAT 222 and low-bandwidth RAT 224 be saved as processor state information during software thread change or for an exception handler. However the state of the RAT in conventional RAT architectures is saved for this very reason, and few additional allocation bits would need to be saved in the case of the divided high-bandwidth RAT 222 and low-bandwidth RAT 224.

When an instruction, including a micro-operation, proffers more logical register addresses to the low-bandwidth RAT 224 than the number of corresponding read or write ports, then the processor should invoke additional structures or rules to deal with the situation. In one embodiment, the processor may include additional pipeline logic to stall the pipeline to permit additional time for multiple read or write operations to use the limited read ports and write ports. This will penalize performance. However, with a careful allocation of logical register addresses between the high-bandwidth RAT 222 and low-bandwidth RAT 224, the frequency of occurrence of such an anomalous situation may be low enough for the performance penalty to be offset by the reduced size and power consumption of the combination high-bandwidth RAT 222 and low-bandwidth RAT 224 when compared to a conventional unitary RAT. In cases where the processor uses a trace cache, another technique for dealing with the anomaly is possible, as described below in connection with FIG. 3.

Figure 3:
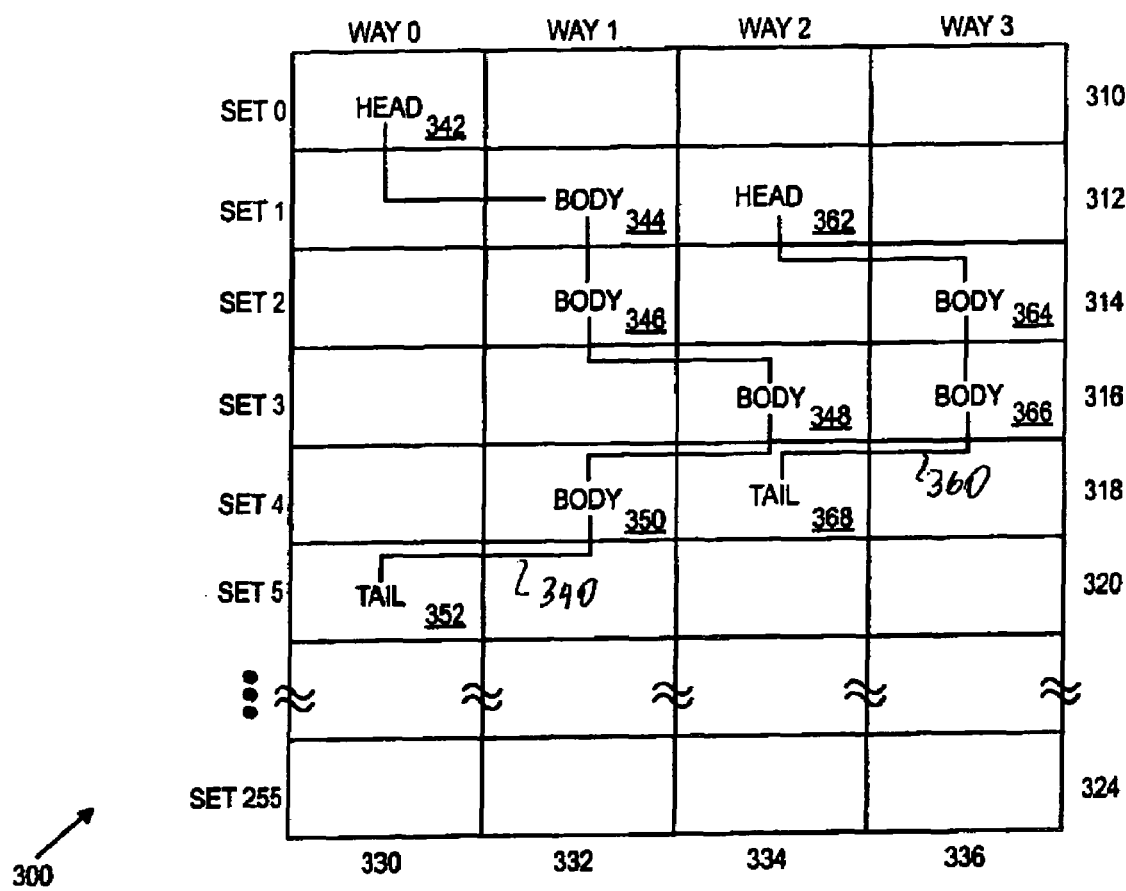
FIG. 3 is a schematic diagram of traces in a trace cache, according to one embodiment of the present disclosure.

Referring now to FIG. 3, a schematic diagram of traces in a trace cache is shown, according to one embodiment of the present disclosure. FIG. 3 illustrates traces 340, 360 of one embodiment, in the context of a 4-way, (330-336), 256-set (310-320, . . . 324) embodiment of trace cache array 300 storing instructions that are decoded micro-ops of macro-instructions. Each storage location in the array, called a data line, may be identifiable by a set number and way number.

Based on the descriptions to follow, those skilled in the art will appreciate that other sizes of set-associate caches, as well as non-set-associate caches, may be employed in other embodiments. Moreover, the instructions may be instructions of any kind.

For ease of further discussion, the first trace element of a trace 340 may be referred to as a trace head, or head 342; the last trace element of a trace being referred to as a trace tail, or tail 352; and the intermediate trace elements being referred to as trace bodies, or bodies 344, 346, 348, and 350. As shown in FIG. 3, trace 360 has head 362, bodies 364 and 366, and tail 368. In the degenerate case of a two-element trace, the second trace element is a trace body as well as a trace tail, and in the degenerate case of a single element trace, the singular trace element is a trace head, a trace segment body, as well as a trace tail at the same time.

The micro-operations represented by various trace heads, bodies, and tails may each access various registers for their source and destination operands. Many of the source operands used by a micro-instruction within the trace may be generated internally by another micro-operation within the trace, and many of the destination operands written by a micro-operation may be used by another micro-operation within the trace. However, some of the source operands used by micro-operations within the trace may have been stored in the registers by operations external to the trace. We may call the registers that contain such externally-generated (with respect to the trace) source operands "live-in" registers. Similarly, some of the destination operands generated by micro-operations within the trace may be used by operations external to the trace. We may call the registers that contain such externally-used (with respect to the trace) destination operands "live-out" registers. This distinction may be significant, in that in some embodiments only the live-in and live-out registers may require register renaming and the resultant need for logical register address to physical register address translations within a RAT.

For a given macro-instruction, a trace in a trace cache may be constructed from the corresponding set of decoded micro-operations in many different manners. However, many manners of trace construction may give poor performance, and for this reason the trace cache logic for constructing traces from the set of decoded micro-operations implements a set of rules for constructing a trace, called "build rules". For example, one conventional build rule may be that a given trace may include no more than 8 micro-operations. If the set of decoded micro-operations for a given instruction contains more than 8 micro-operations, then a trace may be built from the first 8 micro-operations, with the $8^{th}$ micro-operation forming the tail. Then a second trace may be built from the remaining micro-operations.

Another conventional build rule may be a limitation on the number of live-in registers and live-out registers used in the trace. In one embodiment, when a given micro-operation may use no more than 2 source registers and 1 destination register, corresponding to 3 read ports and 1 write port on the RAT, a conventional build rule may be to limit the number of live-in registers to 3 and the number of live-out registers to 1. In this manner the trace may not require more translations from logical register addresses to physical register addresses than a RAT may support in one cycle.

In order to inhibit the situation, described above in connection with FIG. 2, where an instruction, including a micro-operation, proffers more logical register addresses to the low-bandwidth RAT 224 than the number of available read ports or write ports, in one embodiment a new build rule may be imposed on the trace cache logic building the traces.

The new build rule may restrict the number of live-in registers and live-out registers that are serviced by the low-bandwidth RAT 224 to not exceed the number of read ports of the low-bandwidth RAT 224. The new build rule may further restrict the number of live-out registers that are serviced by the low-bandwidth RAT 224 to not exceed the number of write ports of low-bandwidth RAT 224. When traces are built according to this new build rule, the resulting traces should not proffer more logical register addresses to the low-bandwidth RAT 224 than the number of available read ports or write ports.

Figure 4:
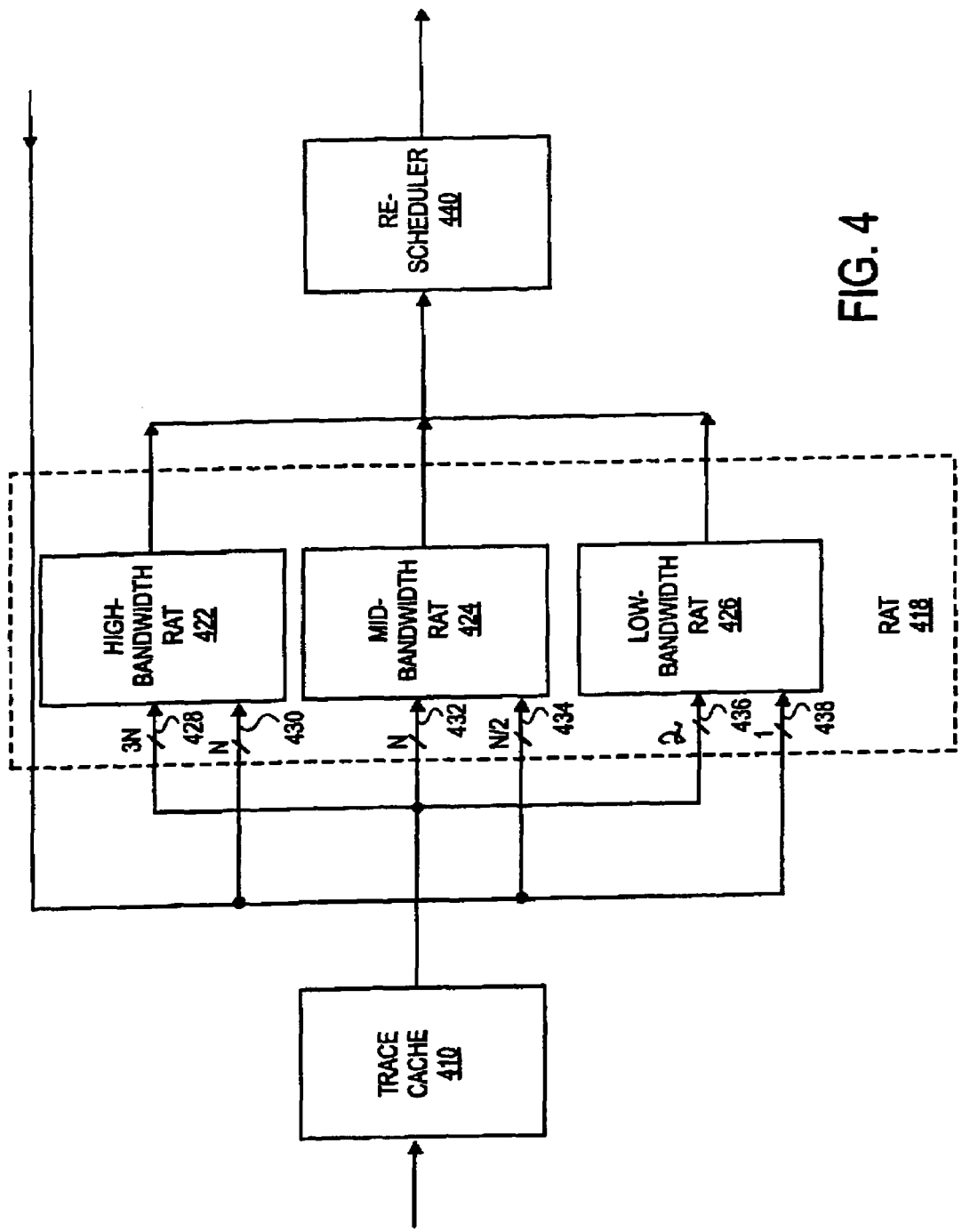
FIG. 4 is a schematic diagram of portions of a pipeline of a processor including three register alias tables, according to one embodiment of the present disclosure.

Referring now to FIG. 4, a schematic diagram of portions of a pipeline of a processor including three register alias tables is shown, according to one embodiment of the present disclosure. In some embodiments, there may be difficulties in determining whether a logical register address should be assigned to a high-bandwidth RAT or to a low-bandwidth RAT. Some quantity of logical register addresses may be accessed less frequently than would justify their inclusion in a high-bandwidth RAT and yet be accessed too frequently to justify their inclusion in a low-bandwidth RAT. This situation may arise when using instruction set architectures with a very large number of logical registers. So in one embodiment there may be a third RAT component which may be called a "mid-bandwidth" RAT. In other embodiments, additional RAT components may be used.

FIG. 4 shows a RAT 418 that includes three component RATs: a high-bandwidth RAT 422, a mid-bandwidth RAT 424, and a low-bandwidth RAT 426. As shown in FIG. 4, trace cache 410 is coupled to RAT 418. Re-scheduler 440 is coupled to RAT 418, as shown in FIG. 4. The high-bandwidth RAT 422 and low-bandwidth RAT 426 are shown with the corresponding number of read ports 428, 436, respectively, and write ports 430, 438, respectively, as used by the high-bandwidth RAT 222 and low-bandwidth RAT 224 of FIG. 2. However, in other embodiments other numbers of read ports and write ports may be used. The mid-bandwidth RAT 424 may have a number of read ports 432 and a number of write ports 434 somewhere between that used by the high-bandwidth RAT 422 and the low-bandwidth RAT 426. In the FIG. 4 embodiment, mid-bandwidth RAT 424 is shown with N read ports 432 and N/2 write ports, although other numbers could be chosen.

In order to deal with the situation, where an instruction, including a micro-operation, proffers more logical register addresses to the low-bandwidth RAT 426 or to the mid-bandwidth RAT 424 than the number of available read ports or write ports, a stall logic may be used. In one embodiment, the processor may include additional pipeline logic to stall the pipeline to permit additional time for multiple read or write operations to use the limited read ports and write ports. In embodiments where the processor utilizes a trace cache, a new build rule may be imposed on the trace cache logic building the traces. The new build rule may restrict the number of live-in registers and live-out registers that are serviced by the low-bandwidth RAT 426 to not exceed the number of read ports of low-bandwidth RAT 426, and restrict the number of live-in registers and live-out registers that are serviced by the mid-bandwidth RAT 424 to not exceed the number of read ports of mid-bandwidth RAT 424. The new build rule may further restrict the number of live-out registers that are serviced by the low-bandwidth RAT 426 to not exceed the number of write ports of low-bandwidth RAT 426, and restrict the number of live-out registers that are serviced by the mid-bandwidth RAT 424 to not exceed the number of write ports of low-bandwidth RAT 424. When traces are built according to this new build rule, the resulting traces should not proffer more logical register addresses to the low-bandwidth RAT 426 or to the mid-bandwidth RAT 424 than the number of available read ports or write ports.

Figure 5:
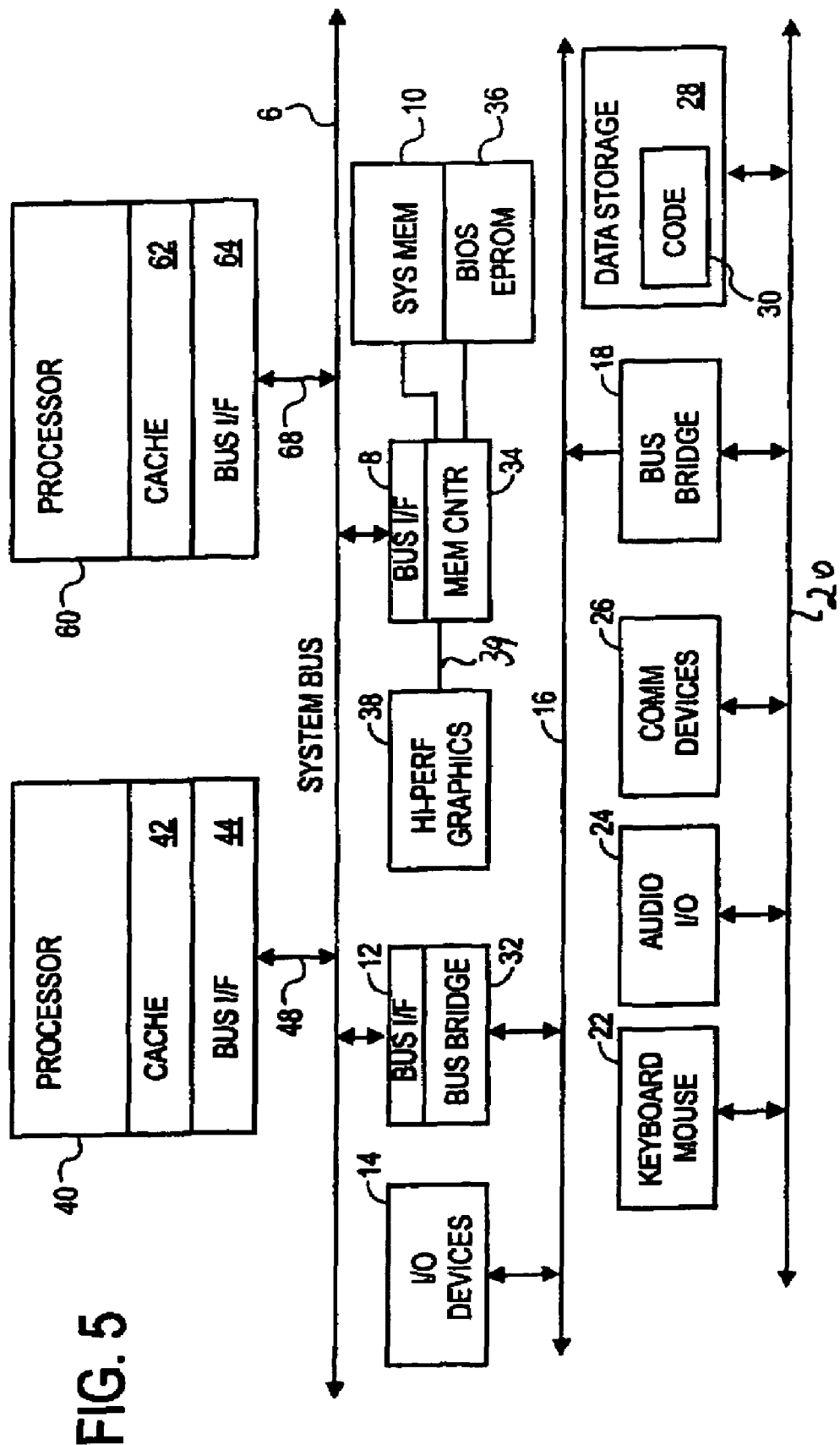
FIG. 5 is a schematic diagram of a microprocessor system, according to one embodiment of the present disclosure.

Referring now to FIG. 5, a schematic diagram of a microprocessor system is shown, according to one embodiment of the present disclosure. The FIG. 5 system may include several processors of which only two, processors 40, 60 are shown for clarity. Processors 40, 60 may include level one caches 42, 62. The FIG. 5 multiprocessor system may have several functions connected via bus interfaces 44, 64, 12, 8 with a system bus 6. As shown in FIG. 5, connection of processors 40 and 60 to system bus 6 is illustrated by lines 48 and 68 respectively. In one embodiment, system bus 6 may be the front side bus (FSB) utilized with Pentium® class microprocessors manufactured by Intel® Corporation. In other embodiments, other busses may be use, or point-to-point interfaces may be used instead of a bus. A general name for a function connected via a bus interface with a system bus is an "agent". Examples of agents are processors 40, 60, bus bridge 32, and memory controller 34. In some embodiments memory controller 34 and bus bridge 32 may collectively be referred to as a chipset. In some embodiments, functions of a chipset may be divided among physical chips differently than as shown in the FIG. 5 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface, or an AGP interface operating at multiple speeds such as 4× AGP or 8× AGP. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
a first register alias table including a first number of read ports to translate a first set of logical register addresses to physical register addresses;
a second register alias table including a second number of read ports to translate a second set of logical register addresses to physical register addresses, wherein said first number that includes at least one read port for each source operand for an instruction is greater than said second number; and
a pipeline logic to stall a pipeline when a first instruction utilizes more logical register addresses from said second set than said second number.

2. The processor of claim 1, wherein said first number is proportional to a third number of logical register addresses in said first set.

3. The processor of claim 1, further comprising a trace cache to supply a trace of micro-operations to said first register alias table and said second register alias table.

4. The processor of claim 3, wherein said trace cache includes trace cache logic to build said trace limiting a third number of live-in and live-out logical registers to said second number.

5. A method, comprising:
storing frequently used translations from logical register addresses to physical register addresses in a first register alias table;
storing less-frequently used translations from logical register addresses to physical register addresses in a second register alias table, where said second register alias table has fewer read ports than said first register alias table that includes at least one read port for each source operand for an instruction; and
stalling a pipeline when a first number of logical register addresses is supplied to said second register alias table, and said first number is greater than a second number of read ports of said second register alias table.

6. The method of claim 5, wherein said storing less-frequently used translations includes identifying said less-frequently used translations from a set of logical register addresses.

7. The method of claim 6, wherein said identifying includes selecting infrequently used temporary registers.

8. The method of claim 7, wherein said infrequently used temporary registers are associated with a long micro-operation flow.

9. The method of claim 6, wherein said identifying includes selecting control registers.

10. The method of claim 9, wherein said identifying includes choosing registers used by a compiler.

11. The method of claim 5, further comprising building a trace in a trace cache whose micro-operations require no more live-in registers and live-out registers using said second register alias table than a first number of read ports of said second register alias table.

12. The method of claim 11, wherein said building includes permitting no more live-out registers using said second register alias table than a second number of write ports of said second register alias table.

13. An apparatus, comprising:
means for storing frequently used translations from logical register addresses to physical register addresses in a first register alias table;
means for storing less-frequently used u-anslations from logical register addresses to physical register addresses in a second register alias table, where said second register alias table has fewer read ports than said first register alias table that includes at least one read port for each source operand for an instruction; and
means for stalling a pipeline when a first number of logical register addresses is supplied to said second register alias table, and said first number is greater than a second number of read ports of said second register alias table.

14. The apparatus of claim 13, wherein said means for storing less-frequently used translations includes means for identifying said less-frequently used translations from a set of logical register addresses.

15. The apparatus of claim 13, further comprising means for building a trace in a trace cache whose micro-operations require no more live-in registers and live-out registers using said second register alias table than a first number of read ports of said second register alias table.

16. The apparatus of claim 15, wherein said means for building includes means for permitting no more live-out registers using said second register alias table than a second number of write ports of said second register alias table.

17. A system, comprising:
a processor including a first register alias table including a first number of read ports to translate a first set of logical register addresses to physical register addresses, and a second register alias table including a second number of read ports to translate a second set of logical register addresses to physical register addresses, wherein said first number that includes at least one read port for each source operand for an instruction is greater than said second number;
an audio input/output device;
an interface to couple said processor to said audio input/output device; and
a pipeline logic to stall a pipeline when a first instruction utilizes more logical register addresses from said second set than said second number.

18. The system of claim 17, wherein said first number is proportional to a third number of logical register addresses in said first set.

19. The system of claim 17, further comprising a trace cache to supply a trace of micro-operations to said first register alias cable and said second register alias table.

20. The system of claim 19, wherein said trace cache includes trace cache logic to build said trace limiting a third number of live-in and live-out logical registers to said second number.

* * * * *

UNITED STATES PATENT AND TRADEMARK OFFICE
CERTIFICATE OF CORRECTION

| | | |
|---|---|---|
| PATENT NO. | : 7,272,701 B2 | Page 1 of 1 |
| APPLICATION NO. | : 10/692436 | |
| DATED | : September 18, 2007 | |
| INVENTOR(S) | : Sodani | |

It is certified that error appears in the above-identified patent and that said Letters Patent is hereby corrected as shown below:

Column 7, at line 43, after "ports" insert --432--.

Column 10, at line 7, delete "u-anslations" and insert --translations--.

Signed and Sealed this

Twentieth Day of May, 2008

JON W. DUDAS
*Director of the United States Patent and Trademark Office*